United States Patent
Sun

(10) Patent No.: US 10,733,152 B2
(45) Date of Patent: Aug. 4, 2020

(54) SYSTEM AND METHOD FOR IMPLEMENTING NATIVE CONTRACT ON BLOCKCHAIN

(71) Applicant: ALIBABA GROUP HOLDING LIMITED, Grand Cayman (KY)

(72) Inventor: He Sun, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/725,290

(22) Filed: Dec. 23, 2019

(65) Prior Publication Data
US 2020/0133926 A1  Apr. 30, 2020

Related U.S. Application Data

(63) Continuation of application No. 16/464,148, filed as application No. PCT/CN2018/125623 on Dec. 29, 2018.

(51) Int. Cl.
| | |
|---|---|
| G06F 16/18 | (2019.01) |
| G06F 16/182 | (2019.01) |
| G06Q 20/40 | (2012.01) |
| H04L 9/06 | (2006.01) |

(52) U.S. Cl.
CPC ....... *G06F 16/1837* (2019.01); *G06Q 20/405* (2013.01); *H04L 9/0637* (2013.01)

(58) Field of Classification Search
CPC . G06F 16/1837; G06F 16/182; H04L 9/0637; H04L 9/06; G06Q 20/405; G06Q 20/40
USPC ...................................................... 707/827
See application file for complete search history.

(56) References Cited

U.S. PATENT DOCUMENTS

| | | | |
|---|---|---|---|
| 9,942,250 | B2 | 4/2018 | Stiansen et al. |
| 9,967,334 | B2 | 5/2018 | Ford |
| 10,168,678 | B2 | 1/2019 | Belveal et al. |
| 10,192,073 | B2 | 1/2019 | Marin |
| 2004/0068726 | A1 | 4/2004 | Levy et al. |
| 2010/0058328 | A1 | 3/2010 | Dehaan |
| 2011/0176491 | A1 | 7/2011 | Stafford et al. |

(Continued)

FOREIGN PATENT DOCUMENTS

| | | |
|---|---|---|
| CN | 106598549 A | 4/2017 |
| CN | 106598579 A | 4/2017 |

(Continued)

OTHER PUBLICATIONS

Written Opinion of the International Searching Authority and International Search Report for PCT Application No. PCT/CN2018/125623 dated Sep. 26, 2019 (6 pages).

(Continued)

*Primary Examiner* — Hicham Skhoun
(74) *Attorney, Agent, or Firm* — Sheppard Mullin Richter & Hampton LLP

(57) ABSTRACT

A computer-implemented method for implementing native contract on blockchain comprises: obtaining combined bytecode associated with a blockchain contract, wherein the combined bytecode comprises an indicator representing a type of the blockchain contract; determining the type of the blockchain contract based at least on the indicator; and executing the blockchain contract based on the determined type of the blockchain contract.

20 Claims, 9 Drawing Sheets

(56) References Cited

U.S. PATENT DOCUMENTS

| | | |
|---|---|---|
| 2014/0337836 A1 | 11/2014 | Ismael |
| 2016/0105350 A1 | 4/2016 | Greifeneder et al. |
| 2016/0314005 A1 | 10/2016 | Greifeneder et al. |
| 2017/0230285 A1 | 8/2017 | Crabtree et al. |
| 2017/0287090 A1* | 10/2017 | Hunn .................. G06F 40/166 |
| 2017/0345011 A1 | 11/2017 | Salami et al. |
| 2017/0352012 A1 | 12/2017 | Hearn et al. |
| 2017/0352027 A1 | 12/2017 | Zhang et al. |
| 2017/0353309 A1 | 12/2017 | Gray |
| 2018/0005186 A1 | 1/2018 | Hunn |
| 2018/0018723 A1 | 1/2018 | Nagla et al. |
| 2018/0078843 A1 | 3/2018 | Tran et al. |
| 2018/0174255 A1 | 6/2018 | Hunn et al. |
| 2018/0219671 A1* | 8/2018 | Velissarios ............ H04L 9/3247 |
| 2018/0219681 A1 | 8/2018 | Geiman et al. |
| 2018/0365201 A1 | 12/2018 | Hunn et al. |
| 2019/0019183 A1 | 1/2019 | Karame et al. |
| 2019/0050831 A1 | 2/2019 | Kikinis |
| 2019/0050855 A1 | 2/2019 | Martino et al. |
| 2019/0058581 A1 | 2/2019 | Wood et al. |
| 2019/0066101 A1 | 2/2019 | Mitchell et al. |
| 2019/0081793 A1 | 3/2019 | Martino et al. |
| 2019/0102163 A1 | 4/2019 | Witherspoon |
| 2019/0108576 A1 | 4/2019 | Laprade et al. |
| 2019/0122317 A1 | 4/2019 | Hunn et al. |
| 2019/0140935 A1 | 5/2019 | Kikinis |
| 2019/0147190 A1 | 5/2019 | Marin |
| 2019/0147440 A1 | 5/2019 | Deliwala et al. |
| 2019/0164153 A1 | 5/2019 | Agrawal et al. |
| 2019/0199531 A1* | 6/2019 | Staples ................. H04L 9/3265 |
| 2019/0205563 A1 | 7/2019 | Gonzales, Jr. |
| 2019/0207995 A1 | 7/2019 | Gonzales, Jr. |
| 2019/0324772 A1* | 10/2019 | Fan ....................... H04L 9/0637 |
| 2019/0334726 A1 | 10/2019 | Kelly |
| 2020/0019421 A1 | 1/2020 | Sun |
| 2020/0034469 A1* | 1/2020 | Sato ..................... G06F 16/258 |
| 2020/0065300 A1* | 2/2020 | Yang ................... G06F 16/2365 |
| 2020/0175003 A1 | 6/2020 | Jiang et al. |

FOREIGN PATENT DOCUMENTS

| | | |
|---|---|---|
| CN | 107392619 A | 11/2017 |
| CN | 107833060 A | 3/2018 |
| CN | 108765158 A | 11/2018 |
| CN | 108833460 A | 11/2018 |
| CN | 109493042 A | 3/2019 |
| CN | 110249307 A | 9/2019 |
| WO | 2017148527 A1 | 9/2017 |
| WO | 2019/042101 A1 | 3/2019 |
| WO | 2019090342 A1 | 5/2019 |
| WO | 2019094488 A1 | 5/2019 |
| WO | 2019109003 A1 | 6/2019 |
| WO | 2019113495 A1 | 6/2019 |
| WO | 2019116184 A1 | 6/2019 |
| WO | 2019133309 A1 | 7/2019 |

OTHER PUBLICATIONS

Extended European Search Report dated Jan. 24, 2020, issued in related European Patent Application No. 18867145.7 (4 pages).

Tien Tuan Anh Dinh et al., "Untangling Blockchain: A Data Processing View of Blockchain Systems,", Arxiv.Org, Cornell University Library, 201 Olin Library Cornell University, Ithaca, NY, Aug. 17, 2017.

"Java class file", Wikipedia, Jan. 18, 2016 (Year: 2016).

Hildebrandt et al., "KEVM A Complete Formal Semantics of the Ethereum Virtual Machine", 2018 (Year: 2018).

Non-Final Office Action for U.S. Appl. No. 16/495,775 dated Mar. 19, 2020.

Preinterview first office action for U.S. Appl. No. 16/735,307 dated Mar. 19, 2020.

PCT International Search Report and the Written Opinion dated Jan. 2, 2020, issued in related International Application No. PCT/CN2019/079712 (7 pages).

Examination Report for European Application No. 18867145.7 dated Feb. 2, 2020 (8 pages).

Search Report for European Application No. 19732214.2 dated May 27, 2020.

Kan Luo et al., "A Multiple Blockchains Architecture on Inter-Blockchain Communication", 2018 IEEE, Jul. 16, 2018.

\* cited by examiner

450

451: obtaining combined bytecode associated with a blockchain contract, wherein the combined bytecode comprises an indicator representing a type of the blockchain contract 452: determining the type of the blockchain contract based at least on the indicator determining if the type of the blockchain contract is a native contract 453: executing the blockchain contract based on the determined type of the blockchain contract 454: in response to determining the blockchain contract is a native contract, triggering a blockchain virtual machine to execute the blockchain contract 455: in response to determining the blockchain contract is a native contract, creating a child process to execute the blockchain contract 456: in response to determining the blockchain contract is a native contract, launching a docker container to execute the blockchain contract

FIG. 4

SYSTEM AND METHOD FOR IMPLEMENTING NATIVE CONTRACT ON BLOCKCHAIN

CROSS REFERENCE TO RELATED APPLICATION

This application is a continuation application of the U.S. patent application Ser. No. 16/464,148 filed on May 24, 2019 and entitled "SYSTEM AND METHOD FOR IMPLEMENTING NATIVE CONTRACT ON BLOCKCHAIN", which is a national phase application of the International Application No. PCT/CN2018/125623, filed on Dec. 29, 2018. The contents of all of the above applications are incorporated by reference in the entirety.

TECHNICAL FIELD

This application generally relates to methods and devices for implementing native contract on blockchain.

BACKGROUND

Blockchain technology promises data storage in a decentralized fashion. The data may be stored in a series of data blocks that have precedence relationship between each other, which forms a chain of blocks. The chain of blocks is maintained by a network of nodes, which are also responsible for validating the data before storing it into the blocks. With cryptography and consensus technologies employed by the nodes, the data stored in the blockchain is almost unchangeable. The network of nodes is also referred to as a blockchain consensus network. Recently, the blockchain technology has expanded to provide a framework for execution of blockchain contracts (or referred to as smart contracts). A blockchain contract is a computer protocol intended to digitally facilitate, verify, or enforce the negotiation or performance of a contract. For example, blockchain contracts allow the performance of credible transactions without third parties.

Current smart contracts are mostly solidity contracts run on the Ethereum Virtual Machine (EVM), because they are required to be written in solidity language. Solidity contracts are a collection of code (contract functions) and data (contract state) that resides at a specific address on the Ethereum blockchain. Some other smart contracts are native contracts. Native contracts may be written in a language other than solidity. Native contracts should not be confused with pre-compiled contracts. Pre-compiled contracts are reusable functions that run outside the EVM but can be invoked from the EVM. For instance, SHA256, RIPEMD160, and ECRECOVER are implemented as pre-compiled contracts. The native contracts allow programmers to write non-deterministic, infinitely running, and sandbox escaping code. For native contracts, developers are not limited by gas (the execution fee for every operation made on Ethereum) and gas-limit, and the code runs significantly faster than on the EVM. However, current blockchain systems require contracts to be written in solidity and lack adequate support for executing native contracts.

SUMMARY

Various embodiments of the present application include systems, methods, and non-transitory computer readable media for implementing native contract on blockchain.

According to one aspect, a computer-implemented method for implementing native contract on blockchain comprises: obtaining combined bytecode associated with a blockchain contract, wherein the combined bytecode comprises an indicator representing a type of the blockchain contract; determining the type of the blockchain contract based at least on the indicator; and executing the blockchain contract based on the determined type of the blockchain contract.

In some embodiments, the combined bytecode comprises bytecode of a dynamic library file compiled from source code of the blockchain contract. In one example, the source code is in c++.

In some embodiments, determining the type of the blockchain contract based at least on the indicator comprises: determining if the type of the blockchain contract is a native contract.

In some embodiments, executing the blockchain contract based on the determined type of the blockchain contract comprises: in response to determining the blockchain contract is a native contract, triggering a blockchain virtual machine to execute the blockchain contract. Triggering the virtual machine to execute the blockchain contract comprises: determining the virtual machine corresponding to the type based at least on the indicator; and triggering the determined virtual machine to execute the dynamic library file.

In some embodiments, executing the blockchain contract based on the determined type of the blockchain contract comprises: in response to determining the blockchain contract is a native contract, creating a child process to execute the blockchain contract. Creating a child process to execute the blockchain contract comprises: creating an executable file; and spawning the child process to launch the executable file to execute the dynamic library file. The child process and a blockchain virtual machine communicate via socket or shared memory.

In some embodiments, executing the blockchain contract based on the determined type of the blockchain contract comprises: in response to determining the blockchain contract is a native contract, launching a docker container to execute the blockchain contract. Launching the docker container to execute the blockchain contract comprises: creating a docker container; and launching the docker container to execute the dynamic library file. The docker container and a blockchain virtual machine communicate via socket.

According to another aspect, a non-transitory computer-readable storage medium is configured with instructions executable by one or more processors to cause the one or more processors to perform operations comprising: obtaining combined bytecode associated with a blockchain contract, wherein the combined bytecode comprises an indicator representing a type of the blockchain contract; determining the type of the blockchain contract based at least on the indicator; and executing the blockchain contract based on the determined type of the blockchain contract.

According to another aspect, a system for implementing native contract on blockchain comprises one or more processors and one or more non-transitory computer-readable memories coupled to the one or more processors and configured with instructions executable by the one or more processors to cause the system to perform operations comprising: obtaining combined bytecode associated with a blockchain contract, wherein the combined bytecode comprises an indicator representing a type of the blockchain contract; determining the type of the blockchain contract based at least on the indicator; and executing the blockchain contract based on the determined type of the blockchain contract.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4 illustrates a flowchart of an exemplary method for implementing native contract on blockchain, in accordance with various embodiments.

DETAILED DESCRIPTION

Blockchain can be considered as a decentralized database, commonly referred to as a distributed ledger because the operation is performed by various nodes (e.g., computing devices) in a peer-to-peer (P2P) network. Any information may be written to the blockchain and saved or read from it. Nodes are, for example, computing devices or large computer systems that support the blockchain network and keep it running smoothly. Each node may provide a part or all of the functions of the blockchain. For example, a node that provides consensus verification may be referred to as a consensus-participating node (or consensus node).

Figure 1A:
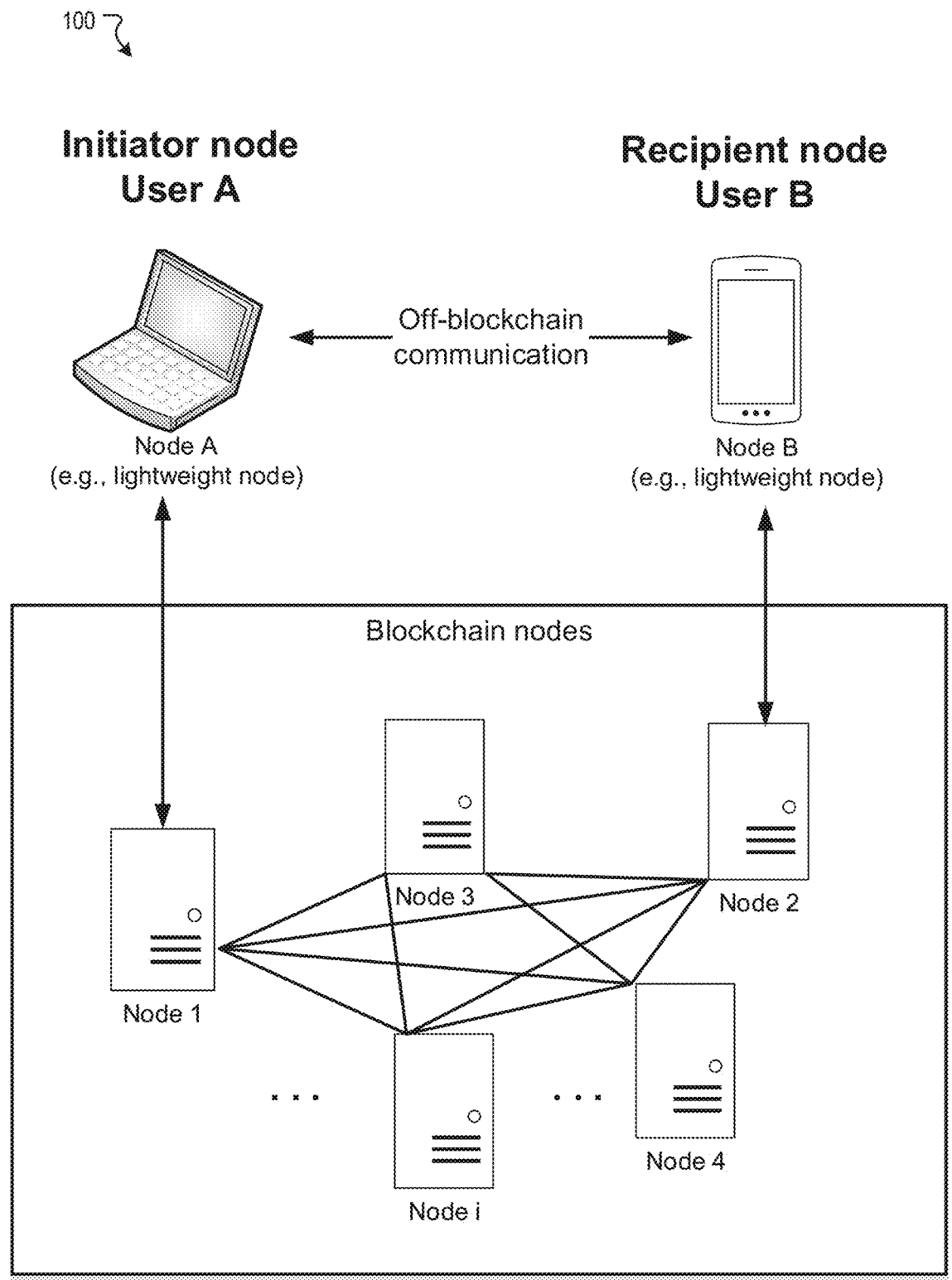
FIG. 1A illustrates an exemplary system for implementing native contract on blockchain, in accordance with various embodiments.

FIG. 1A shows an exemplary system 100 for performing various disclosed steps and methods, in accordance with various embodiments. As shown, a blockchain network may comprise a plurality of blockchain nodes (e.g., node 1, node 2, node 3, node 4, node i, etc.). The blockchain nodes may form a network (e.g., peer-to-peer network) with one blockchain node communicating with another. The order and the number of the blockchain nodes as shown are merely exemplary and for the simplicity of illustration. The blockchain nodes may be implemented in servers, computers, etc. Each blockchain node may correspond to one or more physical hardware devices or virtual devices coupled together via various types of communication methods such as TCP/IP. Depending on the classifications, the blockchain nodes may comprise full nodes, Geth nodes, consensus nodes, etc.

In various embodiments, user A and user B may use corresponding devices such as laptops and mobile phones to trigger the blockchain nodes to execute transactions, which can be carried out by blockchain contracts (e.g., smart contracts). For example, user A may want to transact with user B by transferring some asset in user A's account to user B's account. User A and user B may use corresponding devices installed with an appropriate blockchain software (e.g., cryptocurrency wallet) for the transaction. User A's device may be referred to as an initiator node A that initiates a transaction with user B's device referred to as recipient node B. Node A may access the blockchain through communication with node 1, and Node B may access the blockchain through communication with node 2. For example, node A and node B may submit transactions to the blockchain through node 1 and node 2 to request adding the transactions to the blockchain. Off the blockchain, node A and node B may have other channels of communication (e.g., regular internet communication without going through nodes 1 and 2). In some embodiments, the blockchain software on node A may be considered as a front-end of the blockchain node 1, and the blockchain node 1 runs a back-end of the blockchain software.

Each of the nodes in FIG. 1A may comprise a processor and a non-transitory computer-readable storage medium configured with instructions executable by the processor to cause the node to perform various steps for implementing native contract on blockchain described herein. The each node may be installed with a software (e.g., transaction program) and/or hardware (e.g., wires, wireless connections) to communicate with other nodes and/or other devices. For example, user devices such as node A and node B may be installed with a user-end software such as cryptocurrency wallet, and the blockchain nodes may be installed with a blockchain transaction processing software. Further details of the node hardware and software are described later with reference to FIG. 5 and FIG. 6.

The blockchain nodes may each comprise or couple to a memory. In some embodiments, the memory may store a pool database. The pool database may be accessible to the plurality of blockchain nodes in a distributed manner. For example, the pool database may be respectively stored in the memories of the blockchain nodes. The pool database may store a plurality of transactions submitted by the one or more user devices such as node A operated by users. In some embodiments with respect to an ethereum system, after receiving a transaction request of an unconfirmed transaction, the recipient blockchain node may perform some preliminary verification of the transaction. For example, referring to FIG. 1A, node 1 may perform the preliminary verification after receiving a transaction from node A. Once verified, the transaction may be stored in the pool database of the recipient blockchain node, which may also send the transaction to one or more other blockchain nodes (e.g., node 3, node 4) which repeat the process done by the recipient node. Once the transactions in the corresponding pool database reach certain level, the blockchain nodes may each verify the batch of transactions in the corresponding pool database according to consensus rules or another method. If the transaction involves a blockchain contract, the blockchain node may execute the blockchain contract locally. A certain blockchain node that successfully verifies its batch of transactions (for example, in accordance with consensus rules) may pack the transactions to add to its local copies of the blockchain and spread the results to other blockchain nodes. The certain blockchain node may be one that first completes the successful verification, that has obtained the verification privilege, or that determined based on another consensus rule. The other blockchain nodes may execute the transactions locally, verify the execution results with one another (e.g., by performing hash calculation), and synchronize their copies of the blockchain with that of the certain blockchain node. By updating the local copies of the blockchain, the blockchain nodes may write such information into the local memories. If the verification fails at some point, the transactions are rejected.

Figure 1B:
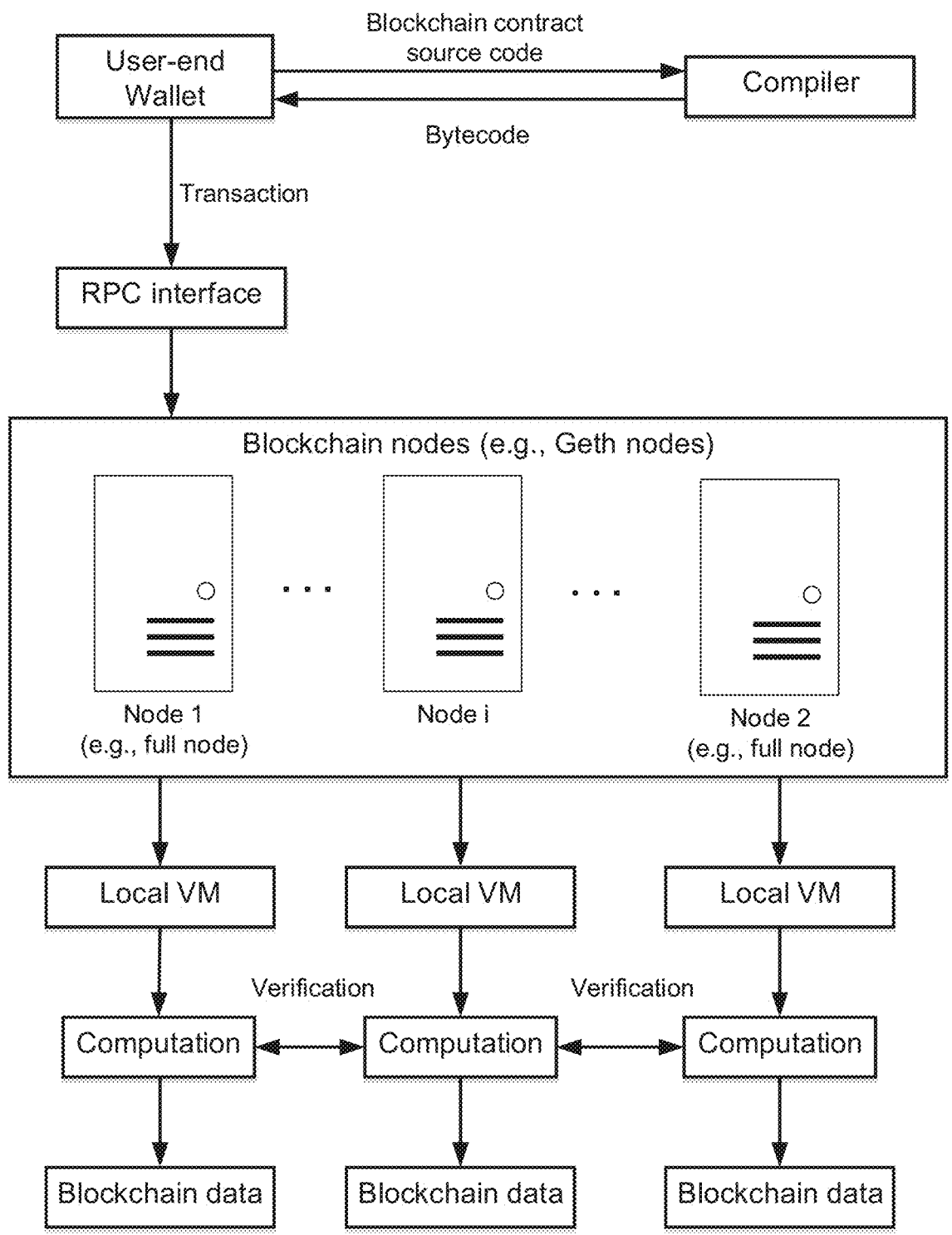
FIG. 1B illustrates an exemplary framework for implementing blockchain contract, in accordance with various embodiments.

FIG. 1B illustrates an exemplary framework for implementing blockchain contract, in accordance with various embodiments. The operations presented below are intended to be illustrative. Depending on the implementation, the exemplary steps may include additional, fewer, or alternative steps performed in various orders or in parallel.

In various embodiments, to deploy a blockchain contract, node A may compile the blockchain contract source code with a compiler, which returns bytecode. Node A may construct and sign a transaction including the bytecode. For example, the transaction may comprise information such as nonce, gasPrice, gasLimit, to (e.g., blockchain contract to be called or an address of a receiver's account), value, data (e.g., the bytecode), and the like. Node A may send the transaction to a blockchain node 1 through a remote procedure call (RPC) interface. RPC is when a computer program causes a procedure (e.g., subroutine) to execute in a different address space (e.g., on another computer such as node 1 on a shared network), which is coded as if it were a normal (local) procedure call, without the programmer explicitly coding the details for the remote interaction. Node 1 may verify if the transaction is valid by verifying the signature. Once verified, node 1 may broadcast the transaction to the blockchain network including various other blockchain nodes. The blockchain nodes may verify the transaction through computation on local virtual machines (VMs) and pack the verified transaction into a new block of the blockchain. The new block will be synchronized to all blockchain nodes.

Current blockchain platforms such as the ethereum system support only solidity contracts. Solidity is the contract-oriented programming language for writing blockchain contracts implemented by ethereum virtual machine (EVM). These blockchain systems do not support contract languages in other program languages such as c++, java, python, etc. As a result, the blockchain systems do not support or execute native contracts (e.g., blockchain contracts written in c++ or other non-solidity languages). Such deficiency in existing technologies curbs the development and limits the application of blockchain systems.

To at least mitigate the deficiencies of current technologies, provide a technical solution to the above-described technical problem, and improve computer functionalities, systems and methods for implementing native contracts on blockchain are disclosed. Support for native contracts may be achieved by the use of a dynamic library to expand the applications of smart contracts. As an example, the systems and methods below are described based on a c++ system. People of ordinary skill in the art would appreciate the application of the disclosed systems and methods on various other computer language systems.

Figure 2:
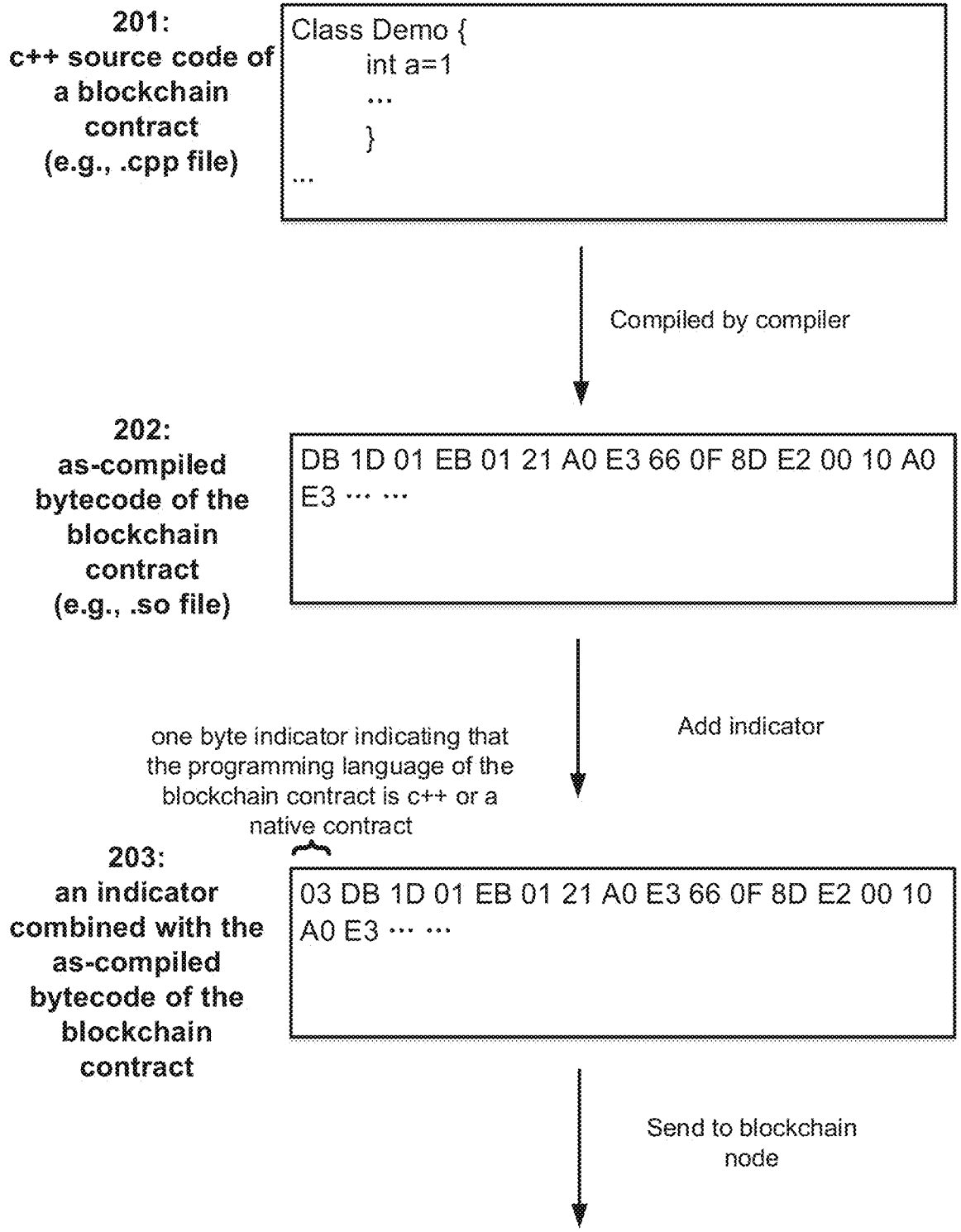
FIG. 2 illustrates an exemplary method for adding indicator, in accordance with various embodiments.

FIG. 2 illustrates an exemplary method for adding indicator, in accordance with various embodiments. The operations presented below are intended to be illustrative. Depending on the implementation, the exemplary steps may include additional, fewer, or alternative steps performed in various orders or in parallel. Though FIG. 2 uses c++ as an exemplary programming language, various other programming languages may be used to write the blockchain contract.

At step 201, a user may program a blockchain contract in c++ on a user device. Part of the exemplary c++ source code is shown. The source code may be sent to a compiler (e.g., c++ compiler). The compiler may be on the user device or another device coupled to the user device.

At step 202, the compiler may compile the source code (e.g., in a .cpp file) into bytecode (e.g., in a .so file) of the blockchain contract. In some embodiments, the user may construct the blockchain contract at front-end in various programming languages (e.g., java, c++, python). The front-end software may be loaded to the user device. Then, the compiler associated with the front-end may compile the blockchain contract into bytecode. A compiler may be a computer software that transforms computer code written in one programming language (the source language) into another programming language (the target language). Compilers can translate source code from a high-level programming language to a lower level language (e.g., assembly language, object code, or machine code) to create an executable program. Bytecode, also termed portable code or p-code, is a form of instruction set designed for efficient execution by a software interpreter. The blockchain contract may be written by human-readable source code in various programming languages, whereas bytecode may be referred to as machine code or object node. Unlike human-readable source code, bytecodes are compact numeric codes, constants, and references (e.g., numeric addresses) that encode the result of compiler parsing and performing semantic analysis of things like type, scope, and nesting depths of program objects. In this case, the bytecode can be read by a blockchain node to execute the blockchain contract.

As an example, first couple bytes of the hex area of the as-compiled bytecode are shown. For clarity, certain part of the bytecode such as the address area and ascii area are not shown. The bytecode may be in hexadecimals. In this specification, the c++ bytecode may be comprised in a dynamic library file (e.g., .so file) that contains instructions for the virtual machine corresponding to c++ to execute the program. In various embodiments, a dynamic library exists outside the executable file or application. During runtime, a link is established between the dynamic library and the executable file or application. A dynamic library comprising special functionalities is launched during program execution, which minimizes overall program size and facilitates improved application performance for reduced memory consumption.

At step 203, the user device (e.g., the wallet software) may insert an indicator in the as-compiled bytecode of the blockchain contract. As an example shown here, the indicator may be added to the very front of the bytecode. The indicator may comprise one byte data indicating the type of the blockchain contract (e.g., whether the blockchain contract is a native contract, the programming language of the blockchain contract, etc.). In this example, the indicator is 03 which indicates a native contract and refers to c++. The indicator may be also in hexadecimals. So, 03 here refers to 0x03. Other various representations may be alternatively used. The indicator may also be inserted at another position in the bytecode.

In some embodiments, the user device (e.g., with a cryptocurrency wallet or another blockchain platform software installed) may prompt the user to enter, select, or otherwise identify the contract type of the blockchain contract (e.g., native contract, solidity contract, java-written contract, c++-written contract, python-written contract, etc.). Based on the user-provided information, the user device may apply the indicator to represent the contract type. The user device may alternatively auto-detect the contract type and apply the indicator to represent the contract type. For example, "03" or "0x03" may represent native contract, and "05" or "0x05" may represent solidity contract. For another example, "01" or "0x01" may represent a contract in solidity language, "02" or "0x02" may represent a contract in java language, "03" or "0x03" may represent a contract in c++ language, "04" or "0x04" may represent a contract in python language, etc. The indicator may be in the bytecode or an alternative format. Though the hexadecimal representation is often used, the indicator may not be limited to the above examples of representation. A person of ordinary skill in the art may appreciate the use of various types of indicator representations. The indicator may be added in front of the as-compiled bytecode of the blockchain contract or at another location. In one example, the indicator is added in front of the bytecode. The indicator may take up one byte or another unit of data.

After the indicator is added to the as-compiled bytecode, combined bytecode is obtained. After step 203, the user device may send the combined bytecode to a blockchain node, and the blockchain node or another blockchain node of the blockchain network may trigger a virtual machine based on the indicator to execute the blockchain contract.

In some embodiments, with the indicator added to the bytecode, the user device may transmit the blockchain contract to one or more consensus nodes. The consensus node may receive combined bytecode comprising the indicator and the as-compiled bytecode of the blockchain contract. After receiving a message that the contract is deployed, the consensus node may obtain a portion (e.g., the indicator at the first byte of the combined bytecode) of the combined bytecode and activate a corresponding virtual machine to execute and store the contract based on the obtained portion of the contract code. In various embodiments, the virtual machine may turn the bytecode into assembly language or other instruction set that can be run by a processor. For example, if the contract code is in c++, GNU compiler collection (GCC) may be called to execute the contract; if the contract code is in java, java virtual machine (JVM) may be called to execute the contract; if the contract code is in solidity, ethereum virtual machine (EVM) may be called to execute the contract; and if the contract code is in python, python virtual machine (PVM) may be called to execute the contract. The above virtual machines are merely exemplary and can be replaced by alternatives.

Figure 3A:
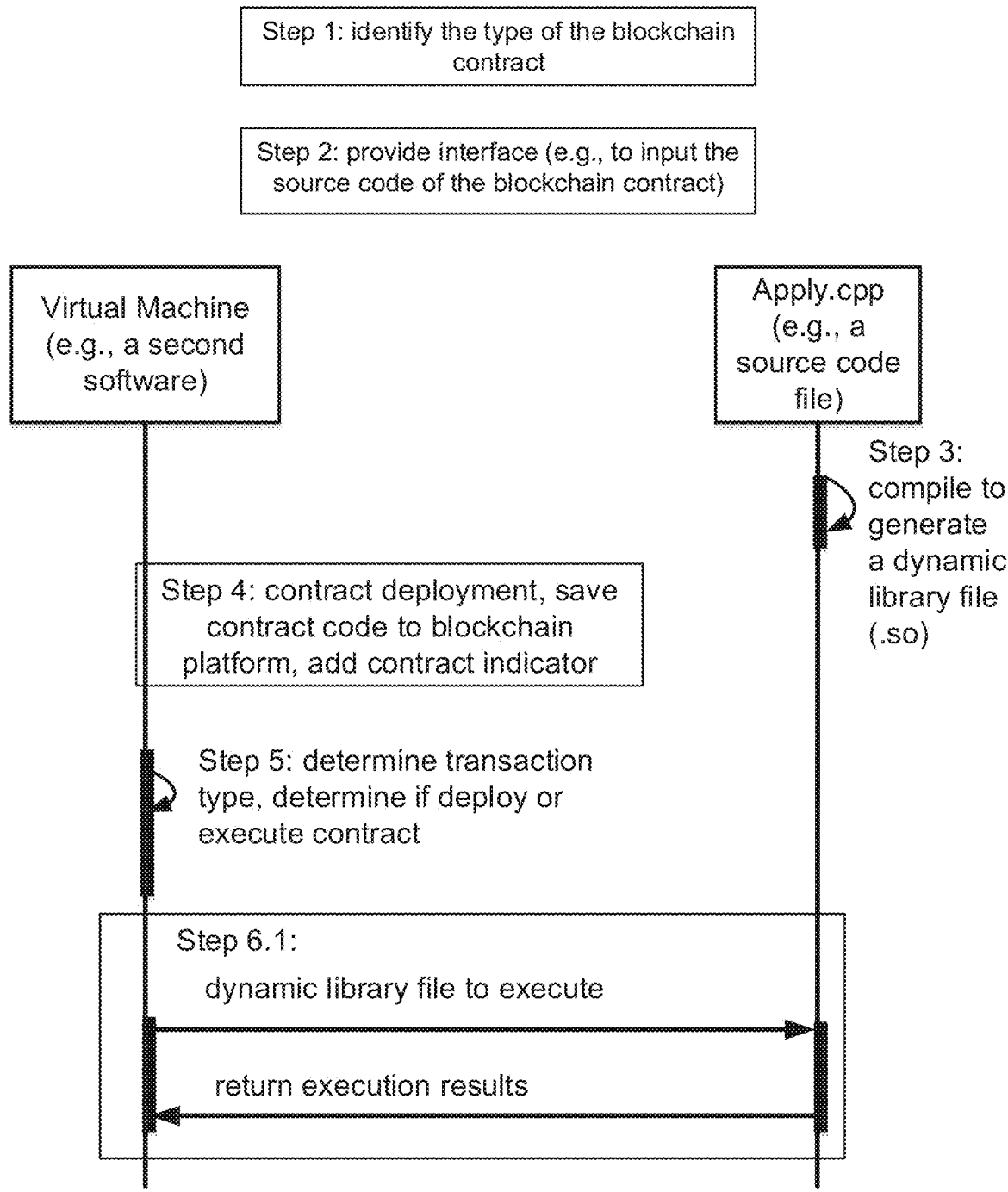
FIG. 3A illustrates an exemplary method for implementing native contract on blockchain, in accordance with various embodiments.
Figure 3B:
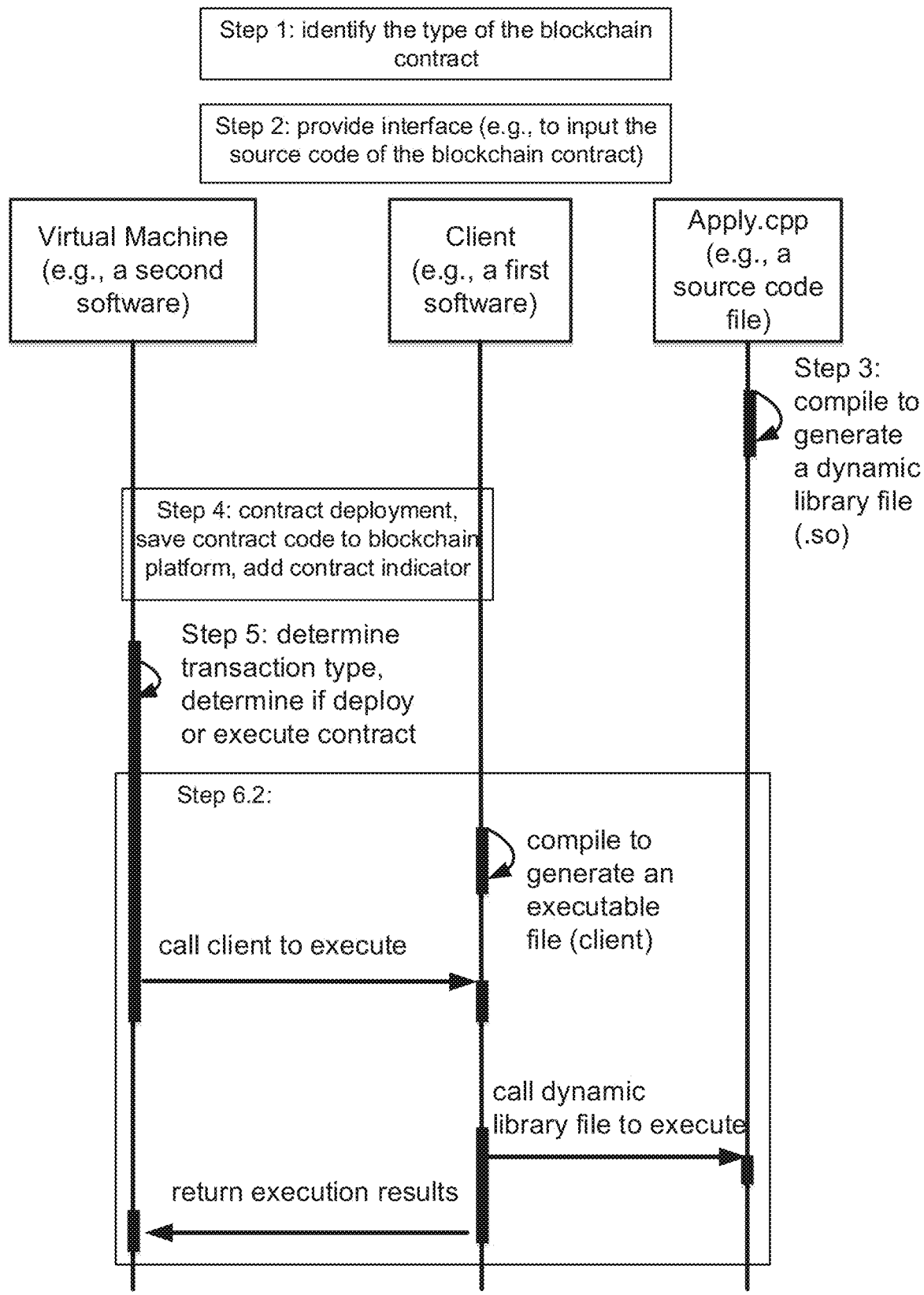
FIG. 3B illustrates an exemplary method for implementing native contract on blockchain, in accordance with various embodiments.
Figure 3C:
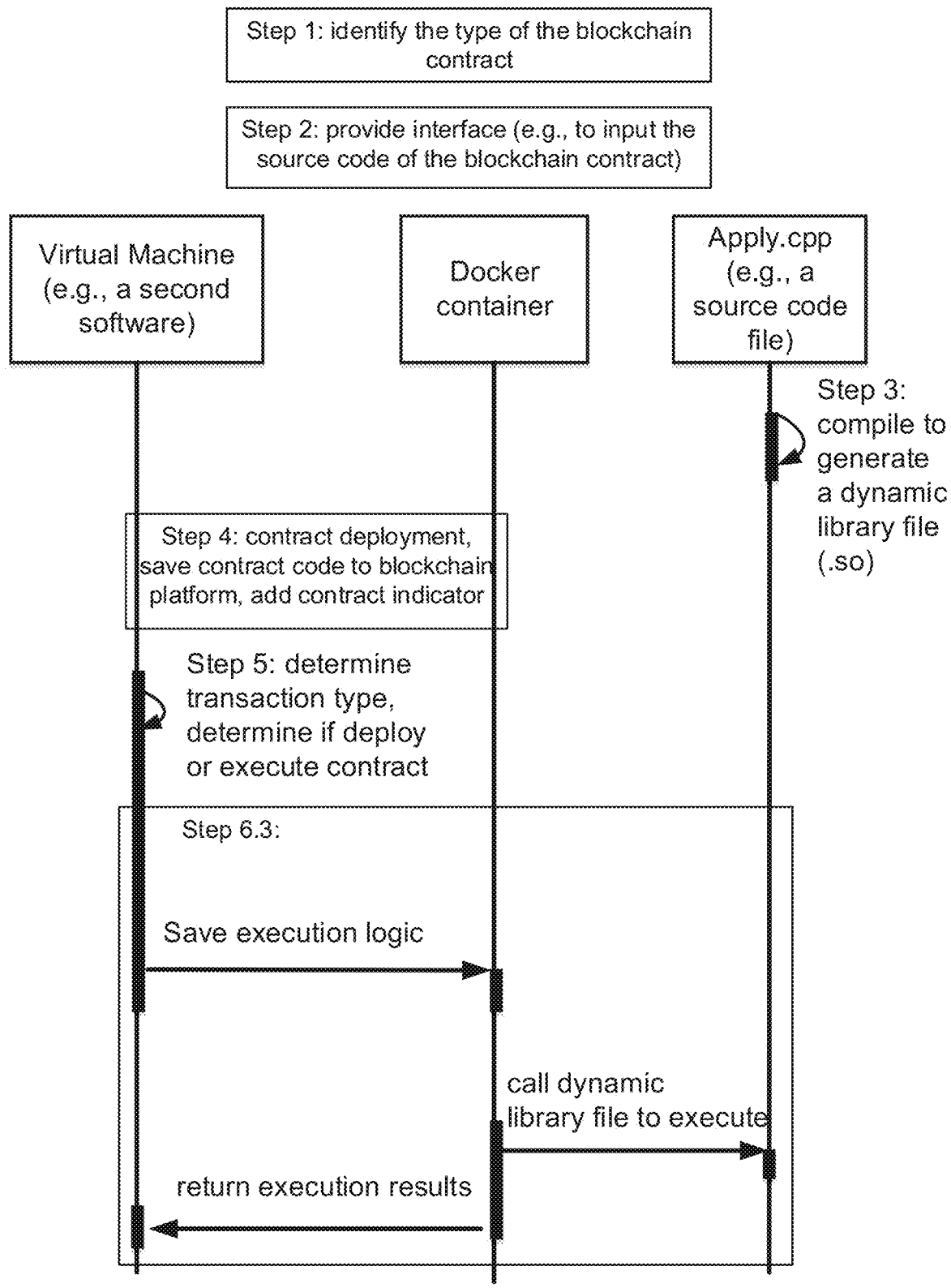
FIG. 3C illustrates an exemplary method for implementing native contract on blockchain, in accordance with various embodiments.

FIG. 3A to FIG. 3C each illustrate a flowchart of an exemplary method for implementing native contract on blockchain, in accordance with various embodiments. The method may be implemented by a blockchain system (e.g., system 100) comprising various software and hardware. For example, the blockchain system may comprise an optional client as a first software and a virtual machine as a second software and have access to a source code file apply.cpp. The operations presented below are intended to be illustrative. Depending on the implementation, the exemplary steps may include additional, fewer, or alternative steps performed in various orders or in parallel. The methods with respect to FIG. 3A to FIG. 3C may share common steps 1 to 5 described below.

In some embodiments, at step 1, a front-end software may prompt a user to identify the type of the blockchain contract to be executed. The front-end may be provided through a blockchain node or through a device (e.g., user device) coupled to the blockchain node. In this specification, the type of the blockchain contract may refer to a category or classification of the blockchain contract. For example, the type may be based on the programming language of the blockchain contract. A blockchain contract may be written in java, c++, solidity, python, etc. The blockchain contract written in solidity may be termed as a solidity contract. A blockchain contract written in java, c++, python, or another language same as the blockchain system may be termed as a native contract. Notwithstanding, the type of the blockchain contract may refer to a category or classification unrelated to the programming language of the blockchain contract.

In one example, the user may be required to identify the contract type, which can be represented by an indicator. The user may identify the contract type through a user interface. If a native contract is indicated, a next step of this method is performed.

In some embodiments, at step 2, in a c++ platform, an interface (e.g., generic interface) may be provided to the user to access the blockchain and execute native contracts. The interface may be provided by dynamical loading. The interface may require pre-determined input and output formats for users to implement native contracts. The input and output formats may comprise methods to call data. According to such requirements, the user may provide source code for the native contract at the interface.

In some embodiments, at step 3, a compiler may compile the native contract (e.g., a source code file (.cpp) in c++ language) to generate a corresponding dynamic library file (e.g., a .so file). The dynamic library file may be in machine code such as bytecode. Details of this step can be referred to FIG. 2 above.

In some embodiments, at step 4, the native contract may be deployed in the blockchain system. For example, the indicator may be added to the bytecode to obtain combined bytecode. That is, the combined bytecode may comprise the indicator and the as-compiled bytecode of the dynamic library file. The combined bytecode may be sent to the blockchain node (e.g., the back-end software). Details of this step can be referred to FIG. 2 above.

In some embodiments, at step 5, the blockchain node may determine if the blockchain contract is a native contract based at least on the indicator. For example, the consensus node may extract a portion of the bytecode corresponding to the indicator to determine if the blockchain contract is a native contract.

In some embodiments, the consensus node back-end may execute the native contract by any of the three steps 6.1-6.3. Step 6.1 is shown in FIG. 3A, step 6.2 is shown in FIG. 3B, and step 6.3 is shown in FIG. 3C.

For step 6.1, the blockchain node may directly execute the blockchain contract in the blockchain system by dynamically linking and/or loading the dynamic library file (or the combined bytecode) and return a result. For example, the blockchain node may trigger a virtual machine corresponding to the blockchain contract to execute the blockchain contract by dynamically linking and/or loading the dynamic library file and return a result. Optionally, the blockchain node may establish a corresponding local dynamic library file for dynamically linking and/or loading the dynamic library file.

For step 6.2, the consensus node may create a child process (e.g., via fork function) to execute the dynamic library file (or the combined bytecode). For example, the consensus node may trigger a virtual machine to call a client to compile the called logic into an executable file (client). The executable file may be used execute the dynamic library file by linking and/or loading the dynamic library file and return an execution result to the virtual machine. The child process and the blockchain system (e.g., the virtual machine or an alternative component of the blockchain system) may communicate via a socket or shared memory. After receiving execution result, the blockchain system may carry on executing a next transaction.

For step 6.3, the consensus node may save the execution logic as a docker. When a user calls to execute a native contract, the docker is activated to call and execute the dynamic library file and return an execution result to the blockchain system. After obtaining the execution result, the blockchain system may carry on executing a next transaction. The docker and the blockchain system (e.g., the virtual machine or an alternative component of the blockchain system) may communicate via a socket.

Docker enables easy pack, ship, and run an application as a lightweight, portable, and self-sufficient container. Docker containers share the operating system as the host operating system shares its kernel with the running docker containers, whereas virtual machine applications each have a guest operating system. Docker makes it possible to set up local development environments that are like a live server, run multiple development environments from the same host that each have unique software, operating systems, and configurations, test projects on new or different servers, and allow anyone to work on the same project with the exact same settings, regardless of the local host environment. Here, docker provides a virtual environment to execute the blockchain contract, which can keep the consensus node shielded from issues caused by the execution (e.g., system restart, bug, malicious code execution, etc.).

FIG. 4 illustrates a flowchart of an exemplary method 450 for implementing native contract on blockchain, according to various embodiments. The method 450 may be implemented by one or more components (e.g., node 1, node 2, . . . , node i, or a combination of node 1 and node A or the like) of the system 100 of FIG. 1A. The method 450 may be implemented by a consensus node corresponding to a hardware machine (e.g., server) and a software (e.g., blockchain software). The method 450 may be implemented by one or more systems or devices (e.g., computer, server). The system or device may comprise one or more processors and one or more non-transitory computer-readable storage media (e.g., one or more memories) coupled to the one or more processors and configured with instructions executable by the one or more processors to cause the system or device (e.g., the processor) to perform the method 450. The operations of method 450 presented below are intended to be illustrative. Depending on the implementation, the exemplary method 450 may include additional, fewer, or alternative steps performed in various orders or in parallel.

Block 451 comprises: obtaining combined bytecode associated with a blockchain contract, wherein the combined bytecode comprises an indicator representing a type of the blockchain contract. In some embodiments, the combined bytecode comprises bytecode of a dynamic library file compiled from source code of the blockchain contract. In one example, the source code is in c++. The word "combined" may indicate the inclusion of the indicator as the combined bytecode may comprise (1) the indicator and (2) the as-compiled bytecode from the source code. The indicator may or may not be in a bytecode format.

Block 452 comprises: determining the type of the blockchain contract based at least on the indicator. In some embodiments, determining the type of the blockchain contract based at least on the indicator comprises: determining if the type of the blockchain contract is a native contract.

Block 453 comprises: executing the blockchain contract based on the determined type of the blockchain contract.

In some embodiments, in block 454, executing the blockchain contract based on the determined type of the blockchain contract comprises: in response to determining the blockchain contract is a native contract, triggering a blockchain virtual machine to execute the blockchain contract. Triggering the virtual machine to execute the blockchain contract comprises: determining the virtual machine corresponding to the type based at least on the indicator; and triggering the determined virtual machine to execute the dynamic library file.

In some embodiments, in block 455, executing the blockchain contract based on the determined type of the blockchain contract comprises: in response to determining the blockchain contract is a native contract, creating a child process to execute the blockchain contract. Creating a child process to execute the blockchain contract comprises: creating an executable file; and spawning the child process to launch the executable file to execute the dynamic library file. The child process and a blockchain virtual machine communicate via socket or shared memory.

In some embodiments, in block 456, executing the blockchain contract based on the determined type of the blockchain contract comprises: in response to determining the blockchain contract is a native contract, launching a docker container to execute the blockchain contract. Launching the docker container to execute the blockchain contract comprises: creating a docker container; and launching the docker container to execute the dynamic library file. The docker container and a blockchain virtual machine communicate via socket.

In current technologies, the blockchain node's blockchain software is unlikely to integrate various types of virtual machines, despite that the hardware machine of the blockchain node may access these virtual machines (e.g., from previous installations in the hardware machine or system configurations). With the disclosed methods, the blockchain node is able to determine the contract type (e.g., whether native or solidity contract, the programming language of the contract) based on the bytecode of the received contract and trigger the corresponding method to execute the contract. With the use of the dynamic library file, native contracts can be supported by the blockchain system for execution without having to convert to solidity contracts. Thus, the application range and compatibleness of the blockchain contract system has been expanded, since the blockchain contract is no longer required to be written in solidity language and native contracts can be executed like solidity contracts.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
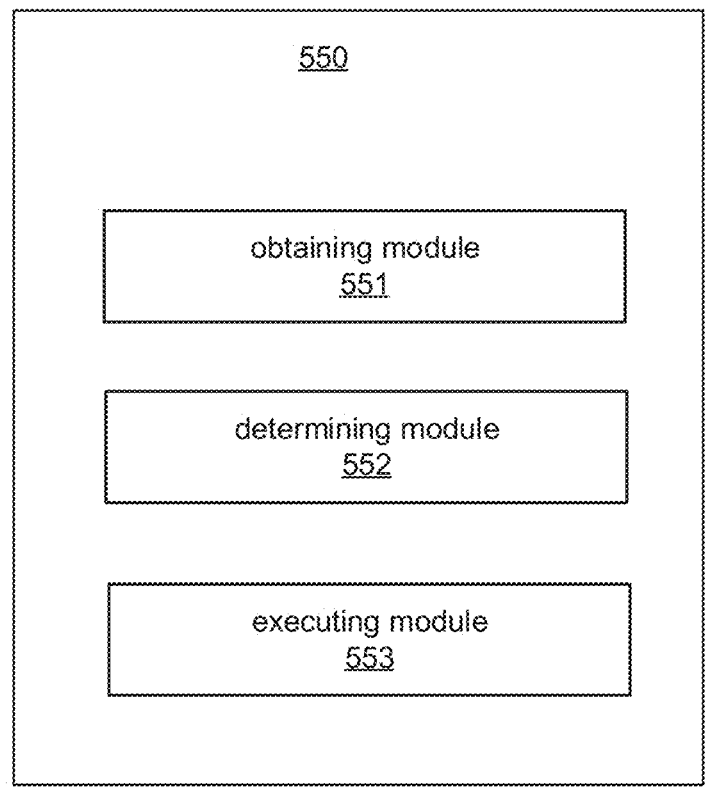
FIG. 5 illustrates a block diagram of an exemplary computer system for implementing native contract on blockchain, in accordance with various embodiments.

FIG. 5 illustrates a block diagram of an exemplary computer system 550 for implementing native contract on blockchain, in accordance with various embodiments. The system 550 may be an exemplary implementation of node 1, a combination of node A and node 1, node 2, . . . , node i of the system 100 of FIG. 1A or a similar device. The method 450 may be implemented by the computer system 550. The computer system 550 may comprise one or more processors and one or more non-transitory computer-readable storage media (e.g., one or more memories) coupled to the one or more processors and configured with instructions executable by the one or more processors to cause the system or device (e.g., the processor) to perform the method 450. The computer system 550 may comprise various units/modules corresponding to the instructions (e.g., software instructions). In some embodiments, the computer system 550 may comprise an obtaining module 551 configured to obtain combined bytecode associated with a blockchain contract, wherein the combined bytecode comprises an indicator representing a type of the blockchain contract; a determining module 552 configured to determine the type of the blockchain contract based at least on the indicator; and an executing module 553 configured to execute the blockchain contract based on the determined type of the blockchain contract.

Figure 6:
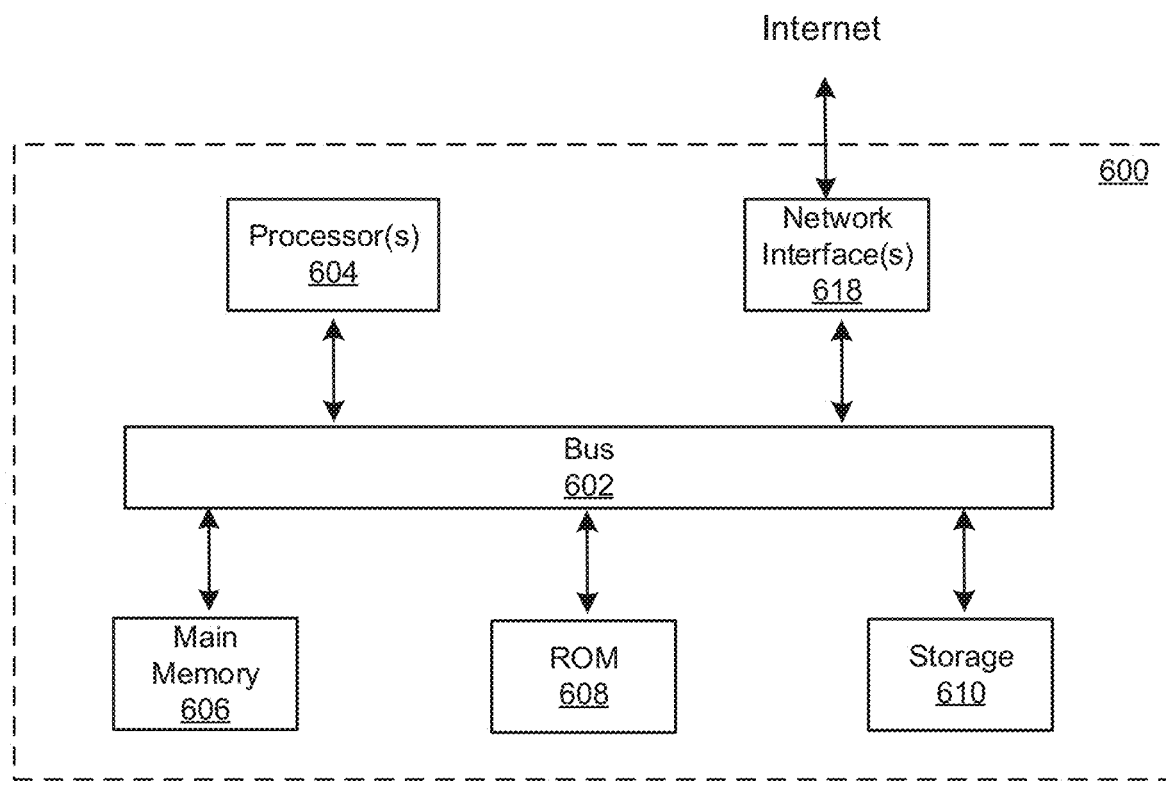
FIG. 6 illustrates a block diagram of an exemplary computer system in which any of the embodiments described herein may be implemented.

FIG. 6 is a block diagram that illustrates a computer system 600 upon which any of the embodiments described herein may be implemented. The system 600 may be implemented in any of the nodes described herein and configured to perform corresponding steps for implementing native contract on blockchain. The computer system 600 includes a bus 602 or other communication mechanism for communicating information, one or more hardware processor(s) 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions. The computer system 600 further includes a read only memory (ROM) 608 or other static storage device coupled to bus 602 for storing static information and instructions for processor(s) 604. A storage device 610, such as a magnetic disk, optical disk, or USB thumb drive (Flash drive), etc., is provided and coupled to bus 602 for storing information and instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the operations, methods, and processes described herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The main memory 606, the ROM 608, and/or the storage system 610 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 600 also includes a network interface 618 coupled to bus 602. Network interface 618 provides a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicate with a WAN). Wireless links may also be implemented. In any such implementation, network interface 618 sends and receives electrical, electromagnetic or optical signals that carry digital data streams representing various types of information.

The computer system 600 can send messages and receive data, including program code, through the network(s), network link and network interface 618. In the Internet example, a server might transmit a requested code for an application program through the Internet, the ISP, the local network and the network interface 618.

The received code may be executed by processor(s) 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present specification. Such embodiments of the subject matter may be referred to herein, individually or collectively, by the term "invention" merely for convenience and without intending to voluntarily limit the scope of this application to any single disclosure or concept if more than one is, in fact, disclosed. The Detailed Description should not to be taken in a limiting sense, and the scope of various embodiments is defined only by the appended claims, along with the full range of equivalents to which such claims are entitled.

The invention claimed is:

1. A computer-implemented method for implementing blockchain contracts on blockchain, comprising:
   obtaining machine code of a blockchain contract, wherein source code of the blockchain contract has been compiled by a compiler into a first bytecode portion, and the obtained machine code is different from the source code, wherein:
      the obtained machine code comprises (1) the first bytecode portion and (2) a second bytecode portion including an indicator representing a type of the blockchain contract,
      the type of the blockchain contract comprises native contract type or solidity contract type,
      the native contract type indicates that the source code of the blockchain contract is written in a high-level programming language other than solidity, and
      the solidity contract type indicates that the source code of blockchain contract is written in solidity;
   determining the type of the blockchain contract based at least on the indicator; and
   executing the blockchain contract based on the determined type of the blockchain contract.

2. The method of claim 1, wherein:
   the first bytecode portion comprises a dynamic library file compiled from the source code of the blockchain contract.

3. The method of claim 2, wherein determining the type of the blockchain contract based at least on the indicator comprises:
   determining, at a blockchain virtual machine, if the type of the blockchain contract is the native contract type or the solidity contract type.

4. The method of claim 3, wherein executing the blockchain contract based on the determined type of the blockchain contract comprises:
   in response to determining that the blockchain contract is the native contract type, triggering the blockchain virtual machine to execute the blockchain contract.

5. The method of claim 4, wherein triggering the blockchain virtual machine comprises:
   determining the blockchain virtual machine corresponding to the native contract type based at least on the indicator; and
   triggering the determined blockchain virtual machine to execute the dynamic library file.

6. The method of claim 3, wherein executing the blockchain contract based on the determined type of the blockchain contract comprises:
in response to determining that the blockchain contract is the native contract type, creating a child process to execute the blockchain contract.

7. The method of claim 6, wherein creating the child process comprises:
creating an executable file; and
launching the executable file to execute the dynamic library file.

8. The method of claim 6, wherein:
the child process and the blockchain virtual machine communicate via socket or shared memory.

9. The method of claim 3, wherein executing the blockchain contract based on the determined type of the blockchain contract comprises:
in response to determining that the blockchain contract is the native contract type, launching a docker container to execute the blockchain contract.

10. The method of claim 9, wherein launching the docker container comprises:
creating a docker container; and
launching the docker container to execute the dynamic library file.

11. The method of claim 9, wherein:
the docker container and the blockchain virtual machine communicate via socket.

12. A non-transitory computer-readable storage medium for implementing blockchain contracts on blockchain, configured with instructions executable by one or more processors to cause the one or more processors to perform operations comprising:
obtaining machine code of a blockchain contract, wherein source code of the blockchain contract has been compiled by a compiler into a first bytecode portion, and the obtained machine code is different from the source code, wherein:
the obtained machine code comprises (1) the first bytecode portion and (2) a second bytecode portion including an indicator representing a type of the blockchain contract,
the type of the blockchain contract comprises native contract type or solidity contract type,
the native contract type indicates that the source code of the blockchain contract is written in a high-level programming language other than solidity, and
the solidity contract type indicates that the source code of blockchain contract is written in solidity;
determining the type of the blockchain contract based at least on the indicator; and
executing the blockchain contract based on the determined type of the blockchain contract.

13. The storage medium of claim 12, wherein:
the first bytecode portion comprises a dynamic library file compiled from the source code of the blockchain contract.

14. The storage medium of claim 13, wherein determining the type of the blockchain contract based at least on the indicator comprises:
determining, at a blockchain virtual machine, if the type of the blockchain contract is the native contract type or the solidity contract type.

15. The storage medium of claim 14, wherein executing the blockchain contract based on the determined type of the blockchain contract comprises:
in response to determining that the blockchain contract is the native contract type, triggering the blockchain virtual machine to execute the blockchain contract.

16. The storage medium of claim 15, wherein triggering the blockchain virtual machine comprises:
determining the blockchain virtual machine corresponding to the native contract type based at least on the indicator; and
triggering the determined blockchain virtual machine to execute the dynamic library file.

17. The storage medium of claim 14, wherein executing the blockchain contract based on the determined type of the blockchain contract comprises:
in response to determining that the blockchain contract is the native contract type, creating a child process to execute the blockchain contract.

18. The storage medium of claim 17, wherein creating the child process comprises:
creating an executable file; and
launching the executable file to execute the dynamic library file.

19. The storage medium of claim 14, wherein executing the blockchain contract based on the determined type of the blockchain contract comprises:
in response to determining that the blockchain contract is the native contract type, launching a docker container to execute the blockchain contract.

20. A system for implementing blockchain contracts on blockchain, comprising one or more processors and one or more non-transitory computer-readable memories coupled to the one or more processors and configured with instructions executable by the one or more processors to cause the system to perform operations comprising:
obtaining machine code of a blockchain contract, wherein source code of the blockchain contract has been compiled by a compiler into a first bytecode portion, and the obtained machine code is different from the source code, wherein:
the obtained machine code comprises (1) the first bytecode portion and (2) a second bytecode portion including an indicator representing a type of the blockchain contract,
the type of the blockchain contract comprises native contract type or solidity contract type,
the native contract type indicates that the source code of the blockchain contract is written in a high-level programming language other than solidity, and
the solidity contract type indicates that the source code of blockchain contract is written in solidity;
determining the type of the blockchain contract based at least on the indicator; and
executing the blockchain contract based on the determined type of the blockchain contract.

* * * * *